United States Patent [19]

Drui et al.

[11] 3,999,962
[45] Dec. 28, 1976

[54] COPPER-CHROMIUM CARBIDE-METAL BOND FOR ABRASIVE TOOLS

[76] Inventors: Mark Simonovich Drui, ulitsa Chekhova, 4, kv. 93; Rima Samuilovna Ovseevich, ulitsa Butlerova, 6, kv. 51; Gennady Afanasievich Senkin, ulitsa Uchitelskaya, 5, korpus 2, kv. 32, all of Leningrad, U.S.S.R.

[22] Filed: May 23, 1975

[21] Appl. No.: 580,426

[52] U.S. Cl. .................................. 51/307; 51/309 R
[51] Int. Cl.$^2$ ..................... B24D 3/06; C04B 31/16
[58] Field of Search ..................... 51/308, 307, 309

[56] References Cited
UNITED STATES PATENTS

| | | | |
|---|---|---|---|
| 2,719,390 | 10/1955 | Jones ................................... | 51/309 |
| 2,828,197 | 3/1958 | Blackmer ............................. | 51/309 |
| 2,833,638 | 5/1958 | Owen ................................... | 51/309 |
| 3,128,165 | 4/1964 | Bridwell et al. ..................... | 51/309 |
| 3,372,010 | 3/1968 | Parsons ................................ | 51/309 |

*Primary Examiner*—Donald J. Arnold
*Attorney, Agent, or Firm*—Lackenbach, Lilling & Siegel

[57] ABSTRACT

A bond used in the manufacture of abrasive tools containing 3 – 75 wt. –% of copper, 15 – 90 wt.–% of chromium chloride; 0.01 – 10 wt.–% of a metal selected from the group including titanium, vanadium, chromium, zirconium, niobium, molybdenum, tungsten; 1 – 30 wt.–% of a low-melting metal; 2 – 30 wt.–% of the metal belonging to the iron subgroup of VIII group of the periodic chart.

The employment of the bond according to the invention, for example in the manufacture of drill bits from an abrasive material based on cube boron nitride has made it possible to drill rocks of VIII – IX categories of drilling capacity at a drill speed and bit meterage exceeding 1.5 – 2 times the drill speed and bit meterage that have formerly been attained with the use of drill bits made of diamond with a bond containing tungsten carbide. While drilling rocks of VI – VIII categories of drilling capacity the bits made from cube boron nitride with the bond according to the invention surpass the carbide-faced bits, i.e. bits made by embedding hard-alloy cutting elements into a steel body by 1.5 times with respect to drill speed and up to 5 – 6 times with respect to bit meterage.

2 Claims, No Drawings

COPPER-CHROMIUM CARBIDE-METAL BOND FOR ABRASIVE TOOLS

The present invention relates to abrasive tools and more particularly it relates to a bond for abrasive tools.

The present invention will be useful in making abrasive tools on the base of boron nitride or diamond. Such abrasive tools are employed for rock drilling, in the building industry, for cutting and grinding hard nonmetallic materials. The abrasive tools made of boron nitride with the bond according to the present invention can be used for making, for example, drill bits for work in the rocks of VI–XI categories of drilling capacity, drills for making holes in ferroconcrete, and cutoff wheels for cutting stones.

With respect to the drilling capacity the categories VI–XI of rock include albitophyres, aleurolites, amphibolites, apatites, gabbro, granites, gneissose-granites, gneisses, dunites, diorites, diabases, bauxites, basalts, beresites, iron ores, metacherts and cornstone, ceratophires, conglomerates, quartzes, quartzites, labradorites, liparites, onokis, peridotites, sandstones, pyroxenites, porphyries, pegmatites, corundum rocks, hornstones, siderites, shales, syenites, scarns, diabasic and silicified tuffs, trachytes, chromites, phosphorites.

Known at present is a bond for abrasive tools based on natural diamond comprising tungsten carbide, cobalt and copper as the main components. This bond is a hard heat-resistant alloy with a cermet structure and a sintering point above 1100° C.

However, the known bond cannot be used for abrasive tools based on boron nitride because heat-resistance of the abrasive material, e.g. cube boron nitride known in the USSR under the trademark "Elbor-P" doesxnot exceed 1000°–1050° C. Heating such an abrasive material above 1050° C causes a modified transition ($\beta$ BN $\rightarrow$ $\alpha$BN) and the material losses its abrasive properties.

Besides, tungsten on which said bond is made is a rare, scarce and expensive material, all this limiting the use of said bond.

Also known in the art are metallic bonds for abrasive tools whose sintering point is below 1000° C. The hardest and most heat-resistant of these bonds contain a metal of the iron sub-group of VIII group in the periodic chart, copper and a low-melting metal, e.g. tin. However, such bonds are unfit for use in the abrasive tools intended for rock drilling since they lack the requisite hardness and heat resistance which are inherent in the bonds with a cermet structure.

Thus, the employment of abrasive tools, e.g. Elbor-R drill bits with a bond based on tungsten carbide is impossible because the abrasive material is destroyed during manufacture while drill bits made of Elbor-R with a bond: metal of, iron subgroup—copper—low-melting metal are unsuitable due to softening of the bond during operation of such drill bits.

An object of the present invention resides in eliminating the aforesaid disadvantages.

The main object of the present invention lies in providing a bond which would be sufficiently hard for being used in abrasive tools based both on boron nitride and diamonds and intended for drilling rocks of VI–XI categories of drilling capacity.

Another object of the present invention is to provide a bond which would possess a heat resistance near or equal to the thermal stability limit of the abrasive tools based on boron nitride.

Still another object of the present invention lies in providing a bond which would feature good wettability with respect to the abrasive material, i.e. boron nitride or diamond.

These objects are achieved by providing a bond for abrasive tools comprising copper, a low-melting metal, a metal of the iron subgroup of group VIII of periodic chart which, according to the present invention, contains additionally chromium carbide and at least one metal selected from the group which includes titanium, vanadium, chromium, zirconium, niobium, molybdenum, tungsten.

Due to inclusion into the bond of the chromium carbide, the hardness of the bond according to the invention has increased to 70 $R_c$ while its heat resistance has risen to the thermal stability limit of the used abrasive material—boron nitride or diamond; owing to the inclusion into the bond of transition metals selected from IV–VI groups of the periodic chart, e.g. titanium, the adhesion of the abrasive material to the bond has risen to the strength limit of the abrasive material.

It is practicable that the bond for abrasive materials according to the present invention should contain 15–90 wt.–% of chromium carbide, 2-30 wt.–% of metal from the iron subgroup of VIII group of the periodic chart, 3–75 wt.–% of copper, 0.01–10 wt.–% of at least one metal selected from a group including titanium, vanadium, chromium, zirconium, niobium, molybdenum, tungsten, and 1–30 wt.–% of low-melting metal.

Besides, it is practicable that the bond according to the invention should contain 73 wt.=% of copper, 20 wt.–% of chromium carbide, 1 wt.–% of titanium, 3 wt.–% of tin and lead and 3 wt.–% of nickel.

Owing to the use of the bond according to the invention, e.g. while making drill bits on the base of "Elbor-R-38 material it has become possible to drill rocks of VIII–X categories of drilling capacity at a drill speed which is 1.5–2 times greater than those achieved formerly with the drill bits made of diamond with a bond containing tungsten carbide. While drilling rocks of VI–VIII categories of drilling capacity the drill bits made of "Elbor-R" on the bond according to the invention feature a drill speed which is 1.5 and 5–6 times greater, respectively, than those of the drill bits of a hard alloy, i.e. bits made by securing hard-alloy cutting elements in a steel body.

The operational characteristics of the drill bits of natural diamonds with the bond according to the invention approach those of the bits made of natural diamonds with a tungsten carbide bond which makes it possible to substitute the scarce and expensive tungsten carbide in the bonds for drilling tools by a sheeper and easily obtainable chromium carbide.

While drilling ferroconcrete the drills made of "Elbor-R" with the bond according to the invention are 3–4 times better than the diamond drilling tools with a bond based on the tungsten carbide and than the carbide-faced tools with respect to the drill speed.

Other objects and advantages of the present invention will become apparent from the detailed description that follows of the bonds for abrasive tools and from the examples of said bond.

The bond for abrasive tools according to the present invention includes copper, a low-melting metal, e.g. tin, a metal from the iron subgroup of VIII group of the periodic chart. It is known that the bond which includes only these components is a low-temperature material and has a metallic structure. We have found that a low temperature bond with a cermet structure can be produced by merely introducing chromium carbide. We have chosen chromium carbide due to the following considerations: it possesses good wettability with respect to the metals of the iron subgroup of VIII group of the periodic system and to copper; it has a high hardness (microhardness about 14000 kg/mm$^2$); besides, chromium carbide is cheep and its production on an industrial scale involves no complications that are characteristic of tungsten carbide production.

We have investigated a number of mechanical properties of alloys in the system of chromium carbide—nickel—copper—tin, such as hardness, bending strength, modulus of elasticity, impact strength and sintering point, using a hot-pressing method under a pressure of 0–300 kg/cm$^2$. We have established that, depending on the composition of the alloys, the hot-pressing temperature varies from 750° to 1200° C with a simultaneous change in hardness from 80 $R_B$ to 70 $R_C$, i.e. this covers the entire range of hardnesses of the bonds for drilling tools. It should be noted that the hot-pressing temperature is the temperature at which the alloy reaches the rated maximum density at a given unit pressure.

A consideration of the phase composition of the alloys has shown that at a temperature of 750 °–1200° C the metallic part of the alloy becomes comparatively homogenized (the metallic part of the alloy includes copper—a metal from the iron subgroup—a low-melting metal) with a simultaneous partial recrystallization of chromium carbide through the liquid metallic part of the alloy which leads to the formation of a bond with a cermet structure.

It has been found that the greatest adhesion to the materials based on boron nitride is displayed by strong transition metals included into IV–VI groups of the periodic chart, namely, titanium, vanadium, chromium, zirconium, niobium, molybdenum, tungsten. The contact with the atmosphere of the above-mentioned metals or alloys containing said metals which boron nitride produces a reaction: BN +Me → Me$_d$B$_b$ +Me$_c$N$_d$. i.e. there takes place the surface decomposition of boron nitride and formation of new phases, i.e. borides and nitrides of the above-mentioned transition metals. Depending on the relation between the thermal effect produced by the formation of nitrides and borides of the corresponding metal it may occur either that the borides and nitrides of the metal will be formed simultaneously or that formation of the borides will be accompanied by liberation of nitrogen in the form of gas or there will be a predominant formation of nitrides.

In any case new phases will be formed on the surface of contact between boron nitride and the transition metal or the alloy containing this metal which ensures wetting of boron nitride. Therefore, we deem it practicable to introduce into the bond according to the invention at least one metal selected from the group including titanium, vanadium, chromium, zirconium, niobium, molybdenum, tungsten.

While investigating the contact layer at the boundary: abrasive material—bond according to the invention in the form of an alloy consisting of copper—metal from the iron subgroup of VIII group of periodic chart—low-melting metal —said transition metal belonging to IV–VI groups of the periodic chart we have established the presence of new phases (borides and/or nitrides of the used transition metal), i.e. we have proved wettability of the abrasive material by the bond. The strength of adhesion of the abrasive material to the bond has increased, becoming commensurate with the strength of the abrasive material itself.

The bond consisting of copper —metal of the iron subgroup of VIII group of the periodic chart (cobalt, iron, nickel) — a low-melting metal (tin, zinc, lead, aluminium, bismuth, cadmium) is taken as a source metallic bond for transformation into a low-temperature cermet bond on the ground of the following considerations.

1. Copper constitutes the base of practically all low-melting alloys (melting temperature below 1000° C) with comparatively high mechanical properties since alloys based on noble metals are scarce and expensive; the alloys based on low-melting metals such as, say, aluminium or zinc have very low mechanical properties, the bonds based on the metals of the iron subgroup or on such metals as molybdenum or tungsten have a too high melting temperature while the bonds based on titanium are too high melting and difficult to process.

Thus, the alloys based on copper are sufficiently strong, heat-conducting and can easily be processed; besides, copper alloys dissolve the above-mentioned transition metals such as titanium, zirconium, niobium.

2. The metals of the iron subgroup of VIII group of the periodic chart are easily fused with copper, i.e. the base of the alloy (e.g. nickel with copper forms continuous solid solutions) and increased the heat resistance of copper alloys. In addition, the metals belonging to the iron subgroup of VII group of the periodic chart wet efficiently the chromium carbide (the angle of wetting of chromium carbide with these metals is near or equal to zero), which is an indispensable prerequisite for forming cermet, and dissolve chromium, vanadium, titanium, zirconium, niobium, molybdenum and tungsten.

3. Low-melting metals are required for reducing the melting temperature of the alloys consisting of copper and said metal of the iron subgroup, all of which have a melting temperature higher than that of copper (1083° C). Besides, it is known that introduction of tin into copper-nickel alloys improves their strength and hardness.

The bond according to the present invention includes the following components:

| | |
|---|---|
| chromium carbide | 15 – 90 wt.-%: |
| metal of iron subgroup of VIII group of periodic chart | 2 – 30 wt.-%; |
| copper | 3 – 75 wt.-%; |
| low-melting metal | 1 – 30 wt.-%; |
| at least one metal selected from the group including titanium, vanadium, chromium, zirconium, niobium, molybdenum, tungsten | 0.01 – 10 wt.-%. |

The above proportion of the components in the bond according to the invention is motivated by the following considerations.

The alloys containing less than 15 wt.—% of chromium carbide do not differ in mechanical properties from purely metal alloys in spite of the change to the cermet structure. We have found that the alloys containing more than 90 wt.—% of chromium carbide have a too high sintering temperature (above 110° C); besides, such alloys are difficult to process since they are sintered with a high residual porosity.

Copper and chromium carbide being the basic components of the bond according to the present invention, an increase in the proportion of one of them brings about a corresponding decrease in the content of the other. An increased proportion of copper reduces the sintering temperature, hardness and heat resistance of the bond; an increased proportion of chromium carbide produces a contrary effect. Therefore, when the copper content is below 3 wt.—%, the alloys prove to be excessively high melting, while the proportion of copper exceeding 75 wt.—% causes the content of chromium carbide to drop below the practicable value.

According to the present invention, the bond for abrasive materials contains not over 30 wt.—% of metal belonging to the iron subgroup of VIII group of the periodic chart otherwise the alloy becomes too high melting while the proportion of said metal of the iron subgroup below 2 wt.—% exerts practically no influence on the properties of the alloy which fact has just caused the suggested lower limit of content of, say, nickel in the bond for abrasive tools.

Experiments have shown that introduction into the bond according to the invention of such low-melting metal as tin in a proportion less than 1 wt.—% fails to exert such an effect on the properties of the bond which is expected after the introduction of a low-melting metal; if the proportion of the low-melting metal is increased above 30 wt.—% there appears an excessively brittle phase in the metal part of cermet which weakens the cermet.

It must be noted that the quantity of introduced metal depends practically on its nature.

For example, it is impracticable to introduce tin in a quantity more than 18–20% of the copper content, i.e. more than 15 wt.—%, it is possible to introduce up to 30 wt.—% of zinc which corresponds to 40% of copper content.

The content of the metal selected from the group which includes titanium, vanadium, chromium, zirconium, niobium, molybdenum, tungsten in the bond according to the invention has been determined considering the nature of the used metal and said content may vary widely.

Thus, practically it is possible to obtain the effect of wettability by introducing as little as 0.01 wt.—% of such elements as chromium or titanium while the content of such elements as molybdenum, vanadium or tungsten may reach 5–10 wt.—%.

The qualitative and quantitative composition of the bond can be checked by a combination of spectral, X-ray diffraction and microscopic analyses.

EXAMPLE 1

Drill bits of 59 mm diameter with the volumetric and cutting elements made from cube boron nitride blanks 4 mm in diameter and 4 mm high employ the bond of the following composition: chromium carbide 23.6 g, nickel 4.30 g, copper 99.8 g, tin 4.8 g, lead 0.3 g, titanium 0.2 g.

The bits are hot-pressed at a pressure of 150 kg/cm$^2$ and a temperature of 950° C.

The bits made by this method are used for drilling iron quartzite of X–XI categories of drilling capacity with wash water. The drill speed averaged 2.5 m/hr at an average bit meterage of 1 m. The diamond drill bits with the bond based on tungsten carbide have produced an average mechanical drill speed of 0.8 m/hr at an average bit meterage of 0.8 linear metres.

EXAMPLE 2

Drill bits of 59 mm dia with the volumetric and cutting elements made from cube boron nitride blanks 4 mm in diameter and 4 mm high employ the bond of the following composition:

| | | |
|---|---|---|
| chromium carbide | 73 | g, |
| nickel | 11.7 | g, |
| copper | 26.1 | g, |
| tin | 8 | g, |
| cadmium | 2 | g, |
| vanadium | 4.5 | g. |

The bits are hot-pressed at a pressure of 300 kg/cm$^2$ and a temperature of 1000° C.

The bits manufactured in this manner are used for airblast drilling of monolithic quartz reefs of X category of drilling capacity. The average mechanical drill speed is 4.6 m/hr and the bit meterage, 0.80 linear metre.

Under the same conditions the diamond drill bits with a bond based on tungsten carbide display a drill speed of 1.35 m/hr at a bit meterage of 0.8 m.

EXAMPLE 3

Drill bits of 59 mm diameter with the volumetric and cutting elements made from cube boron nitride blanks 4 mm in diameter and 4 mm high employ the bond of the following composition:

| | | |
|---|---|---|
| chromium carbide | 20.4 | g |
| nickel | 3.4 | g |
| copper | 67.4 | g |
| zinc | 56.3 | g |
| aluminium | 0.8 | g |
| chromium | 0.05 | g |

The bits are hot pressed at a pressure of 150 kg/cm$^2$ and a temperature of 780° C. The bits produced in this manner are used for drilling iron quartzite of X–XI categories of drilling capacity with wash water. The average mechanical drill speed is 2.3 m/hr at a bit meterage of 0.9 linear metre; the average mechanical drill speed of the diamond bits with a bond based on tungsten carbide while drilling the same rocks is 0.8 m/hr at an average bit meterage of 0.8 linear metre.

EXAMPLE 4

Drill bits of 76 mm diameter with the volumetric and cutting elements made from cube boron nitride blanks 4 mm in diameter, 4 mm high employ the bond of the following composition:

| | | |
|---|---|---|
| chromium carbide | 107.3 | g |
| nickel | 9.4 | g |
| cobalt | 4.8 | g |
| copper | 60.5 | g |
| tin | 11.8 | g |
| bismuth | 0.3 | g |
| zirconium | 0.3 | g |

The bits are hot-pressed at a pressure of 150 kg/cm² and a temperature of 1000° C.

The bits manufactured in this manner used for drilling siltstone or a siltstone stratum with sandstone streaks have an average mechanical drill speed of 8 m/hr at a bit meterage of 80 linear metres. While drilling the same rocks, carbidefaced bits ensure a drill speed of 5.5 m/hr at a bit meterage of 14 linear metres.

EXAMPLE 5

Drills of 36 mm diameter with the cutting elements made of cube boron nitride blanks 4 mm in diameter, 4 mm high employ the bond of the following composition:

| chromium carbide | 5.8 | g |
|---|---|---|
| iron | 3.1 | g |
| copper | 17.8 | g |
| tin | 1.9 | g |
| niobium | 0.3 | g |
| titanium | 0.1 | g |

The drills are hot pressed at a presure of 150 kg/cm² and a temperature of 1000° C.

While drilling ferroconcrete with a strength of 300 kg/cm² and reinforcement bars of 12–16 mm diameter the average drill speed is 4 – 5 m/hr at a drill meterage of 3.5 linear metres.

Under the same conditions diamond drills with a bond based on tungsten carbide ensure a mechanical drill speed of 1.3 m/hr at a drill meterage of 1.5 linear metres; under the same conditions carbide-faced drills give a mechanical speed of 1.5 m/hr at a drill meterage of 0.7 linear metre.

EXAMPLE 6

Drill bits of 59 mm diameter made of natural diamond employ the bond of the following composition:

| chromium carbide | 55.6 | g |
|---|---|---|
| nickel | 44 | g |
| copper | 35.3 | g |
| tin | 1.6 | g |
| molybdenum | 8.7 | g |
| chromium | 2.1 | g |
| tungsten | 2.5 | g |

The bits are hot-pressed at a pressure of 150 kg/cm² and a temperature of 1250° C.

During airblast drilling of monolithic quartz of X category of drilling capacity the average drilling speed is 1.5 m/hr at a bit meterage of 0.9 m.

Under the same conditions, similar diamond bits with a band based on tungsten carbide give a drill speed of 1.35 m/hr at a bit meterage of 0.8 linear metre.

EXAMPLE 7

Drill bits of 59 mm diameter made from natural diamond employ the bond of the following composition:

| chromium carbide | 109.2 | g |
|---|---|---|
| cobalt | 1.3 | g |
| nickel | 10.9 | g |
| copper | 6.5 | g |
| tin | 1.4 | g |
| titanium | 0.2 | g |

The bits are hot-pressed at a pressure of 300 kg/cm² and a temperature of 1000° C.

While drilling red granite slabs of VIII–IX categories of drilling capacity the average mechanical drill speed is 3.0 m/hr at a bit meterage of 32 linear metres.

Under the same conditions the diamond bits with the bond based on tungsten carbide give a drill speed of 2.2 m/hr at a bit meterage of 34 linear metres.

What we claim is:

1. a Bond for abrasive tools composed of 3–75 weight percent of copper, 15–90 weight percent of chromium carbide, 0.01–10 weight percent of at least one metal selected from the group consisting of titanium, vanadium, chromium, zirconium, niobium, molybdenum tungsten 1–30 weight percent of at least one low melting metal selected from the group consisting of Sn, Zn, Cd, Pb, and Al, 2–30 weight percent of a metal belonging to the iron subgroup of group VIII of the periodic chart.

2. A bond for abrasive tools according to claim 1 composed of 73 wt.–% of copper; 20 wt.–% of chromium carbide; 1 wt.–% of titanium; 3 wt.–% of tin and lead; 3 wt.–% of nickel.

* * * * *